April 17, 1951 — W. B. JOHNSON — 2,549,476

TRANSPLANTING DIGGER

Filed Oct. 5, 1949

Inventor
WILLIAM B. JOHNSON
By Ralph B. Stewart
Attorney.

Patented Apr. 17, 1951

2,549,476

UNITED STATES PATENT OFFICE 2,549,476

TRANSPLANTING DIGGER

William B. Johnson, Easley, S. C.

Application October 5, 1949, Serial No. 119,702

7 Claims. (Cl. 294—50.8)

This invention relates to a hand-operated digger suitable for use in transplanting flowers, shrubbery and small trees.

An object of the invention is to provide a transplanting digger which will enable the operators to remove plants from the ground quickly and easily.

Another object is to provide a transplanter which will cause a minimum of disturbance to the plant soil in digging and burlapping.

Still another object is to provide a transplanter having a separable main frame for ease in placing the tool in position around the plant.

A further object is to provide a transplanter which may be used to dig the hole in which the plant is to be subsequently placed, thereby assuring a clean job with no loose dirt or air pockets to retard ground moisture from reaching the plant.

In accomplishing the objects of my invention, my digger comprises a digging scoop of bowl shape, divided along a vertical plane to form two cooperating halves. The two halves are pivotally supported at their corners on horizontal axes so that they may be rotated from a closed position through substantially 90 degrees to a digging position where they may be forced into the ground. The edges of the two halves of the scoop adjacent the dividing plane constitute the digging edges. Preferably the scoop is of hemispherical form but it may be of any other form generated by a surface of revolution, such as a hemicylindrical form.

A preferred form of my invention is illustrated in the accompanying drawing in which.

Figure 1:
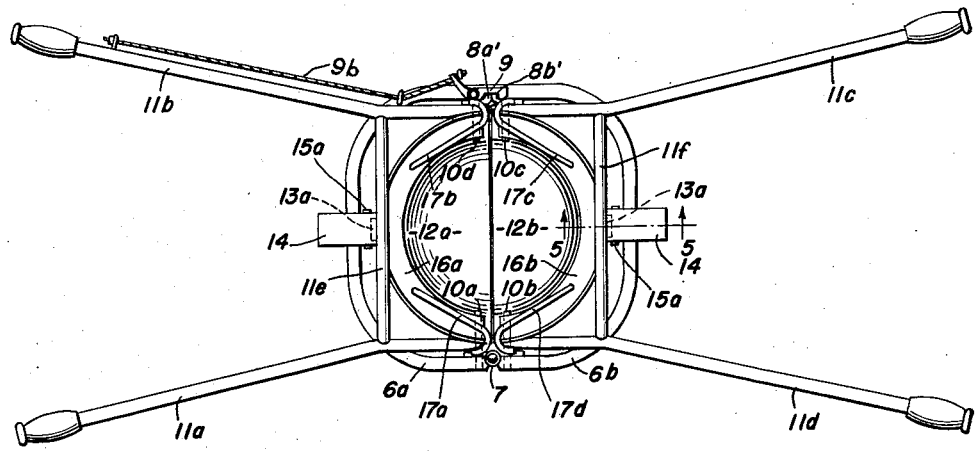
Figure 1 is a top plan view of the transplanter with the handles in their locked position.

Referring to the drawing, a main frame 6 of the digger is formed of two generally U-shaped members 6a and 6b having one of each respective pair of legs joined by a hinge 7 comprising two hinged plates 7a and 7b. Adjacent the ends of the other two legs are mounted latch plates 8a and 8b having outwardly-extending flanges 8a' and 8b' formed thereon. When the main frame 6 is in a closed position these flanges abut one another and are engaged by latch 9 which is pivoted on a pin 9a mounted on member 6b. A lanyard 9b may be used to release this latch if desired.

Mounted beneath the members 6a and 6b, extending through hinge plates 7a and 7b and latch plates 8a and 8b respectively and securely fastened to such plates are transverse pins 10a, 10b, 10c and 10d. Pivotally mounted on these pins are handle bars or arms 11a, 11b, 11c, and 11d, respectively. Arms 11a and 11b are connected by cross-brace 11e and arms 11c and 11d are connected by cross-brace 11f, thus forming two generally H-shaped handle frames having their shorter legs pivotally attached to the main frame 6. The ends of the longer legs are provided with grip elements as shown in the drawing. Preferably, the frame 6 and the two handle frames are formed of metal pipe stock.

The digger blade is in the shape of a hemispherical or bowl-shaped scoop formed of two halves 12a and 12b; these halves are mounted on the frame 1 in such a manner that they pivot about their corners to open and close the scoop. For this purpose the corners of the halves are pivotally mounted on pins 10a, 10b, 10c and 10d. The edge of each half midway between the pins is attached to one of the cross-braces 11e, 11f by means of a fish-plate 13 having a projecting lip 13a formed thereon. This lip projects outwardly from the cross-brace 11e or 11f in a plane generally along the handles 11a, 11b, 11c, 11d, as the case may be, for a purpose to be more fully explained. This construction allows the scoop halves 12a and 12b to be opened or closed by manipulation of the two handle frames 11a, 11b and 11c, 11d.

Figures 2, 5:
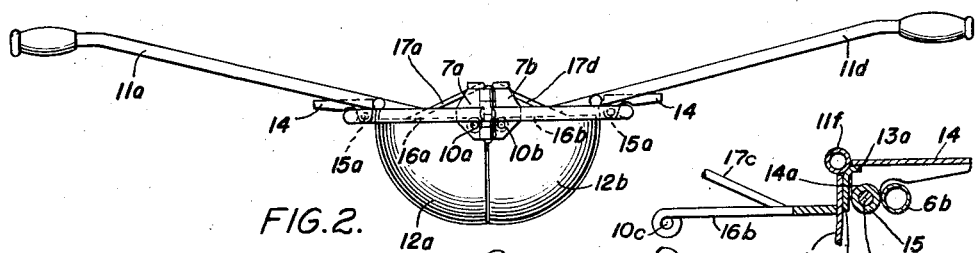
Figure 2 is an elevational view of the transplanter from the side showing the main frame hinge and with the handles in their locked position.
Figure 5 is an enlarged sectional view along the line 5—5 of Figure 1.

In order to lock the handle frames in an approximately horizontal position with the scoop closed so the arms may be used as carrying handles, lock pedals 14 are provided on the main frame halves 6a and 6b at points intermediate the hinge 7 and latch 9 and in alignment with the lips 13a of the plates 13 attached to the cross-braces 11e and 11f. Referring to Figure 5, these locking pedals are generally U-shaped in cross-section and the legs of the U are extended to form ears 14a which straddle a bushing 15 that is attached to the main frame member 6b. The locking pedal 14 is pivotally mounted on the frame 6 by means of a transverse pin 15a extending through the bushing 15 and through the ears 14a. Springs (not shown for the sake of clarity) are provided to bias the pedals 14 to the position shown in Figure 5 where they engage the lips 13a and lock the two halves of the scoop in the closed position, the arms 11a, 11b, 11c, 11d being in their extended position so they may be used to lift the transplanter containing the plant. When it is desired to remove the transplanter from the plant, the scoop halves are released by pressing down on the pedals 14, thus disengaging them from the lips 13a and allowing the arms 11a, 11b, 11c, 11d to be moved to the raised position.

In order to prevent the soil being loosened when the scoop halves are being opened in removing the transplanter from the plant, arcuate scraper members 16a and 16b are provided which extend around the interior circumference of the scoop and have their ends anchored to the inner end portions of pins 10a, 10b, 10c, 10d. To provide the necessary rigidity for the scrapers, braces 17a, 17b, 17c, 17d are provided which extend from intermediate points on the arcuate scrapers 16a and 16b to the top edges of the hinge leaves 7a, 7b and the plates 8a, 8b. As shown in the drawing, these braces are looped or curved at the end which is joined to the hinge plates or latch plates to prevent interference with the two halves of the scoop, and with the handle bars when the scoop is opened. These arcuate scrapers are semi-annular in form, as shown in Figures 1 and 4, and they are stationary with respect to the main frame and hold the soil in place when the scoop halves are being opened, thus serving to scrape the soil cleanly from the scoop.

Figure 4:
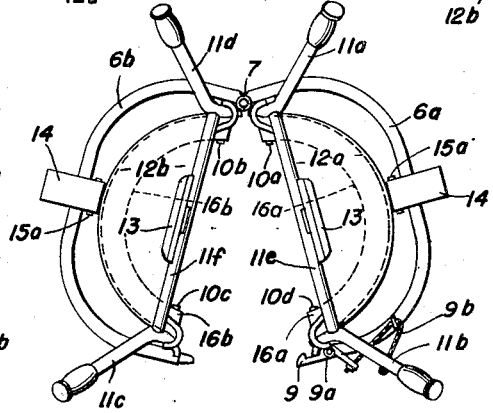
Figure 4 is a top plan view of the transplanter with the handles in the raised position and showing how the main frame is opened when placing the tool in position around the plant, the transplanter in this figure being turned through 180° with respect to the position shown in Figure 1.
Figure 3:
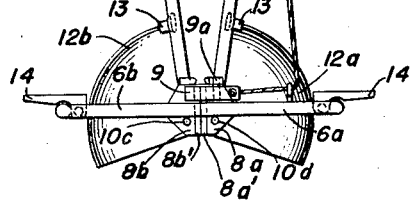
Figure 3 is an elevational view from the side having the main frame locked and with the handles in their raised position.

To use the transplanter, the two handle frames are raised to vertical position, the latch 9 is released, and the main frame 6 is opened as shown in Figure 4 preliminary to placing the transplanter around the plant. After the transplanter is positioned around the plant the two halves of the main frame are closed and fastened by latch 9. With the two handle frames in raised position as shown in Figure 3, the transplanter is then pressed into the ground by foot pressure applied on the main frame until this frame is resting on the surface of the ground. It will be understood that pressure is applied simultaneously to opposite sides of the frame 1 by two operators, as by pressing upon latch pedals 14. The two scoop halves are then closed by rotating the two handle frames until they reach the position shown in Figure 2 and the locking pedals 14 have locked the scoop halves to the main frame 6. The plant may then be lifted out of the ground by use of arms 11a, 11b, 11c, 11d and placed wherever desired. To remove the transplanter from the plant the above operations are reversed.

It will be understood that before digging up the plant to be moved, the digger may be used to dig the hole to receive the plant, and by so doing the dirt moved with the plant completely fills the hole without leaving any air pockets.

Also, where plants are to be burlapped and shipped, the burlap may be placed in a hole which has been dug by the digger and the plant is then placed in the hole from the digger, and the burlap is then bound up about the soil without breaking or disturbing it. If desired, a burlapping frame having a cavity of the same shape as the digger scoop may be provided for use with the digger.

What I claim is:

1. A transplanter comprising a main frame formed in two U-shaped parts arranged to form a closed frame, means pivotally securing two abutting ends of said parts together whereby said frame may be opened and closed, fastening means to hold said frame in said closed position, a generally hemispherical scoop formed in two half parts, each of said scoop parts being pivotally mounted at their corners in one of said frame parts, and a pair of handles pivotally mounted on said main frame parts and attached to said scoop halves.

2. A transplanter comprising a horizontal main frame formed of two generally U-shaped sections arranged as a closed ring, means pivotally connecting together two abutting ends of said sections, latching means to hold the other abutting ends of said sections in closed position, two generally H-shaped handle frames having their short legs pivotally mounted on said U-shaped sections adjacent the ends of the arms thereof, a generally hemispherical scoop formed in two halves, each of said halves being carried by one of said H-shaped frames between the short legs thereof, and locking means mounted on said U-shaped sections and engaging the cross members of said handles to lock said scoop halves in the closed position.

3. A transplanter according to claim 1 and including a pair of stationary scrapers arranged to bear against the soil inside said scoop and hold the soil in place during the opening of the said scoop halves.

4. A transplanter according to claim 3 wherein said scrapers comprise arcuate sections of an annular ring disposed about the inside circumference of said scoop and are rigidly fastened to said main frame sections.

5. A transplanter comprising a frame, a scoop formed in two halves, means pivotally mounting said halves upon said frame for movement from a closed position to an open position, a pair of stationary scraper elements, and means for mounting said scraper elements in fixed position upon said frame and arranged within said halves to bear against the soil inside said scoop and to hold the soil in place during the opening of said scoop halves.

6. A transplanting digger comprising a bowl shaped scoop divided along a vertical plane to form two parts, means pivotally supporting said parts on horizontal axes at their corners so that said parts may be rotated from a closed position through substantially 90 degrees to an open position, operating handles secured to said scoop parts and extending substantially horizontally outwardly in opposite directions from said scoop in the closed position thereof, and means for latching said handles against relative movement in the closed position of said scoop.

7. A digger according to claim 6 and including a pair of scraper elements supported in fixed position within the top portions of said scoop parts and conforming closely to the inner surfaces thereof.

WILLIAM B. JOHNSON.

REFERENCES CITED

The following references are of record in the file of this patent:

UNITED STATES PATENTS

| Number | Name | Date |
|---|---|---|
| 407,465 | Brick | July 23, 1889 |